United States Patent
Cesiel et al.

(10) Patent No.: US 12,291,121 B2
(45) Date of Patent: May 6, 2025

(54) DYNAMIC LOAD MANAGEMENT FOR ELECTRIC VEHICLE CHARGING

(71) Applicant: GM GLOBAL TECHNOLOGY OPERATIONS LLC, Detroit, MI (US)

(72) Inventors: Douglas S. Cesiel, Farmington, MI (US); Samantha Gunter Miller, Berkley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 569 days.

(21) Appl. No.: 17/740,514

(22) Filed: May 10, 2022

(65) Prior Publication Data
US 2023/0365018 A1 Nov. 16, 2023

(51) Int. Cl.
*B60L 53/62* (2019.01)
*B60L 53/14* (2019.01)
*B60L 53/30* (2019.01)
*B60L 53/60* (2019.01)
*B60L 53/63* (2019.01)
*B60L 53/66* (2019.01)
*H02J 7/00* (2006.01)

(52) U.S. Cl.
CPC ............ *B60L 53/62* (2019.02); *B60L 53/305* (2019.02); *B60L 53/60* (2019.02); *B60L 53/63* (2019.02); *B60L 53/66* (2019.02); *B60L 53/14* (2019.02); *H02J 7/00032* (2020.01); *H02J 2310/52* (2020.01); *H02J 2310/60* (2020.01); *Y02T 90/16* (2013.01)

(58) Field of Classification Search
CPC ........ B60L 53/305; B60L 53/60; B60L 53/63; B60L 53/66; B60L 53/62
See application file for complete search history.

(56) References Cited

U.S. PATENT DOCUMENTS

2014/0062419 A1\* 3/2014 Kasaya ................. B60L 3/0069
320/160
2022/0185136 A1\* 6/2022 Reineccius ............. B60L 53/63

\* cited by examiner

*Primary Examiner* — Julian D Huffman
*Assistant Examiner* — Lisa Kotowski
(74) *Attorney, Agent, or Firm* — Quinn IP Law

(57) ABSTRACT

A system for charging an electric vehicle in a facility includes a current sensor adapted to obtain an input current signal for a power source in the facility. An electric vehicle supply equipment (EVSE) is configured to charge the electric vehicle through the power source based at least partially on a control pilot signal. A controller has a processor and tangible, non-transitory memory on which instructions are recorded for dynamically adjusting the control pilot signal based on the input current signal. The control pilot signal is set to a predefined maximum when the input current signal is less than a main circuit breaker rating of the facility. The controller is configured to reduce the control pilot signal from the predefined maximum when the input current signal is at or above the main circuit breaker rating.

10 Claims, 3 Drawing Sheets

DYNAMIC LOAD MANAGEMENT FOR ELECTRIC VEHICLE CHARGING

INTRODUCTION

The present disclosure relates to dynamic load management for charging an electric vehicle. The use of purely and partially electric vehicles, such as battery electric vehicles, range-extended electric vehicles, hybrid electric vehicles, and fuel cell hybrid electric vehicles, has increased greatly over the last few years. Electric vehicles include a rechargeable energy storage unit, such as a high voltage battery having a number of battery cells, which requires periodic recharging. The charging may be done at a public or private charging station. Many places, such as dwellings, may not be suitable for charging an electric vehicle without an extensive utility service upgrade. For example, a utility service upgrade may involve expensive and laborious activities, such as trenching and restoring uprooted lawn, cement, trees and other items to install wires rated for higher current.

SUMMARY

Disclosed herein is a system for charging an electric vehicle in a facility. An electric vehicle supply equipment (EVSE) is configured to connect the electric vehicle to a power source in the facility. The EVSE is adapted to charge the electric vehicle based at least partially on a control pilot signal. The system includes a current sensor adapted to obtain an input current signal for the power source. A controller is in communication with the EVSE. The controller has a processor and tangible, non-transitory memory on which instructions are recorded for dynamically adjusting the control pilot signal based on the input current signal.

The controller is configured to obtain a plurality of factors, including an EVSE circuit breaker rating and a main circuit breaker rating of the facility. The control pilot signal is set to a predefined maximum when the input current signal is less than the main circuit breaker rating of the facility. The controller is configured to reduce the control pilot signal from the predefined maximum when the input current signal is at or above the main circuit breaker rating of the facility.

In some embodiments, the facility is a dwelling. The plurality of factors includes an available ampacity for the EVSE. The controller may be adapted to adjust the control pilot signal to match the available ampacity for the EVSE when the input current signal is not available. In some embodiments, the predefined maximum corresponds to at about 80% of the EVSE circuit breaker rating. The controller may be embedded with the EVSE.

In one embodiment, the controller is adapted to reduce the control pilot signal from the predefined maximum, when the input current signal is at or above the main circuit breaker rating, in a curved or exponential fashion. In another embodiment, the controller is adapted to reduce the control pilot signal from the predefined maximum in a stepwise fashion. In yet another embodiment, the controller is adapted to reduce the control pilot signal from the predefined maximum in a linear fashion. The system may include a distribution panel having a plurality of circuit breakers corresponding to respective branch circuits around the facility, the current sensor being operatively connected to a portion of the distribution panel.

Disclosed herein is a method for charging an electric vehicle in a facility with a system having a controller with a processor and tangible, non-transitory memory. The method includes connecting an electric vehicle supply equipment (EVSE) between the electric vehicle and a power source in the facility, the EVSE being adapted to charge the electric vehicle based at least partially on a control pilot signal. A current sensor is connected to the power source. The method includes obtaining an input current signal for the power source, via the current sensor. A plurality of factors is obtained, including an EVSE circuit breaker rating and a main circuit breaker rating of the facility, via the controller. The method includes dynamically adjusting the control pilot signal based on the input current signal and the plurality of factors, via the controller, including setting the control pilot signal to a predefined maximum when the input current signal is less than the main circuit breaker rating of the facility. The control pilot signal is reduced to below the predefined maximum when the input current signal is at or above the main circuit breaker rating of the facility.

The above features and advantages and other features and advantages of the present disclosure are readily apparent from the following detailed description of the best modes for carrying out the disclosure when taken in connection with the accompanying drawings.

Figure 1:
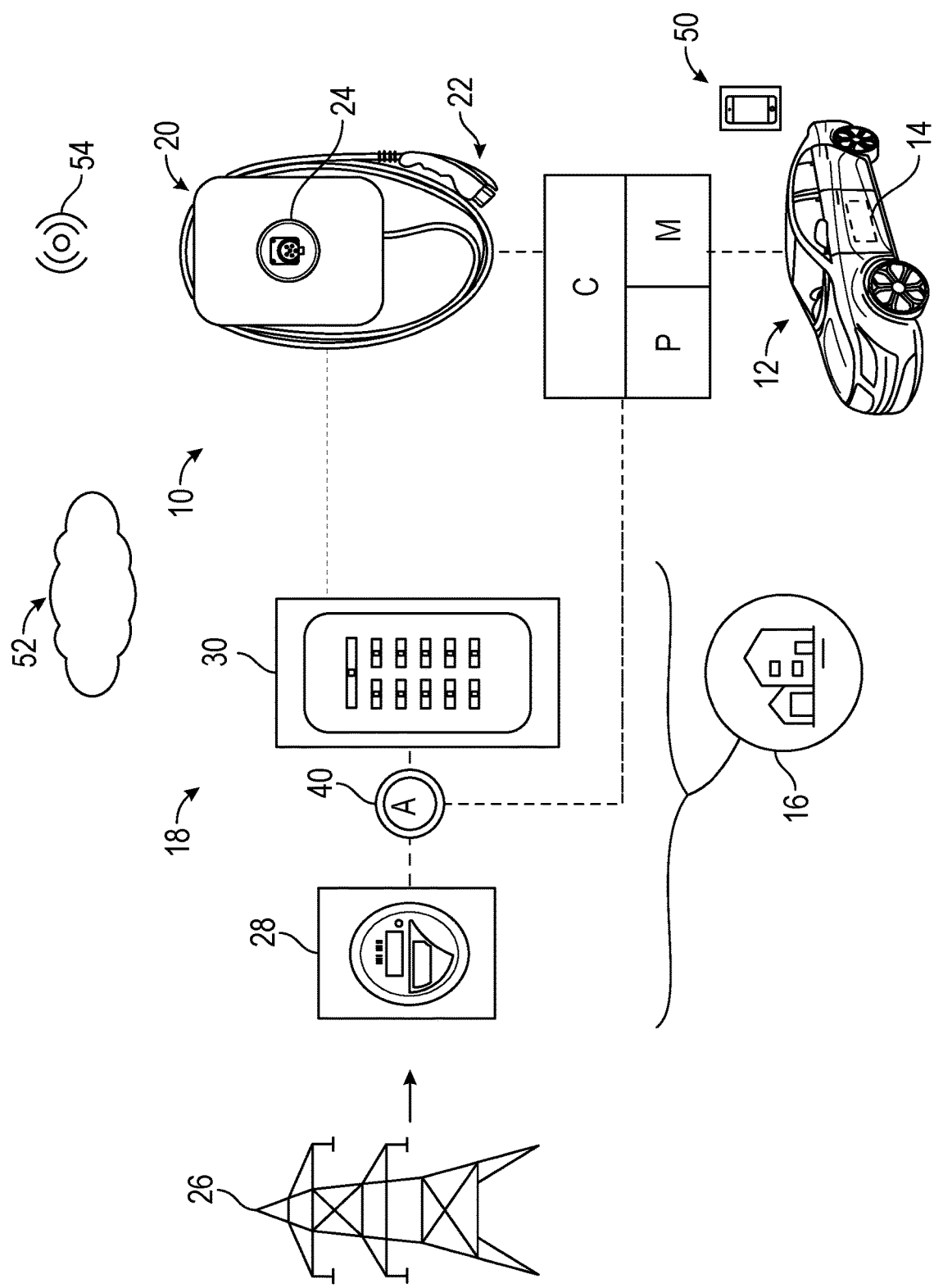
FIG. 1 is a schematic diagram of a system for charging an electric vehicle in a facility, the system having a controller.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a system 10 for charging an electric vehicle 12. The electric vehicle 12 may be purely or partially electric. The electric vehicle 12 may be a mobile platform, such as, but not limited to, a passenger car, sport utility vehicle, light truck, heavy duty vehicle, ATV, minivan, bus, transit vehicle, bicycle, robot, farm implement, sports-related equipment, boat, plane, train or other device. It is to be understood that the electric vehicle 12 may take many different forms and have additional components.

Referring to FIG. 1, the electric vehicle 12 includes a rechargeable energy storage unit 14, such as a high voltage battery having a number of battery cells. The rechargeable energy storage unit 14 may include battery cells of different chemistries, including but not limited to, lithium-ion, lithium-iron, nickel metal hydride and lead acid batteries. The electric vehicle 12 may include an additional power source (not shown), such as but not limited to, an internal combustion engine or a fuel cell.

The electric vehicle 12 is capable of utilizing an external source of power, e.g., a socket that connects to a power source or power grid to store electrical energy within its rechargeable energy storage unit 14. Public charging stations are typically found street-side or at retail shopping centers, public facilities, and other parking areas. Charging stations are equipped with multiple connectors to be able to supply a wide variety of vehicles. However, places such as dwellings and commercial buildings, may not be suitable for charging an electric vehicle 12 without an extensive utility service upgrade.

Referring to FIG. 1, the system 10 includes a controller C having at least one processor P and at least one memory M (or non-transitory, tangible computer readable storage medium) on which instructions may be recorded for executing a method 100 (described below with respect to FIG. 2) for dynamically adjusting the load transferred from a power source 18 in a facility 16 to the electric vehicle 12. The facility may be a dwelling (e.g., detached house, apartment building, condo etc.) or a commercial structure/building. The memory M can store controller-executable instruction sets, and the processor P can execute the controller-executable instruction sets stored in the memory M.

The system 10 allows the electric vehicle 12 to be charged in the facility 16 without requiring an extensive utility upgrade. Industry standards (e.g., NEC Article 220 Service Calculation) provide calculations for determining the required utility service rating (in amperes) based on the size of a home or commercial building and the appliances/devices that are installed within it. Upgrades (e.g., adding a high-power 19 kW EVSE) generally require replacement of the wires supplying electric power to the home and an electric panel rated for higher current.

Referring to FIG. 1, the load is transferred via an electric vehicle supply equipment 20, referred to herein as EVSE 20. The EVSE 20 may include various types of coupling devices, attachments and connectors, such as element 22 and element 24. In some embodiments, the EVSE 20 may be fixedly attached or "hardwired" to the facility 16, eliminating the need for a plug and receptacle connection system to connect to the AC power supply of a home, for example. The EVSE 20 acts as a conduit for supplying electrical power to charge plug-in electric vehicles. The controller C may be embedded within the EVSE 20. The system 10 provides a method 100 for automatic continuous adjustment of EVSE power throughout the charge cycle.

The EVSE 20 is configured to charge the electric vehicle 12 based at least partially on a control pilot signal. The control pilot signal is a signal from the EVSE 20 to the electric vehicle 12 indicating how much current the electric vehicle 12 is allowed to draw from the EVSE 20. In other words, the control pilot signal is a communication line between the EVSE 20 and the electric vehicle 12 that can be updated frequently (as often as every 1 millisecond) for the purpose of communicating the maximum current that the electric vehicle 12 is allowed to consume from the EVSE 20.

Referring to FIG. 1, the power source 18 in the facility 16 may be a distribution panel 30 receiving power generated by an electrical grid or utility 26. Power from the utility 26 is generally transferred through a network of power lines that connect to an individual facility 16. The electricity first goes through an electric meter 28 and then passes through to the distribution panel 30. The electric meter 28 measures how much electricity the facility 16 is using.

Referring to FIG. 1, system 10 includes a current sensor 40 (shown with abbreviation "A" for ampere) configured to obtain an input current signal received by the power source 18 in the facility 16. Where the facility 16 is a home, the input current signal reflects the total home input current. The input current signal is sent to the controller C, where it is used for dynamically adjusting the charging load for the electric vehicle 12. The current sensor 40 may be operatively connected to a portion of the distribution panel 30.

Figure 3:
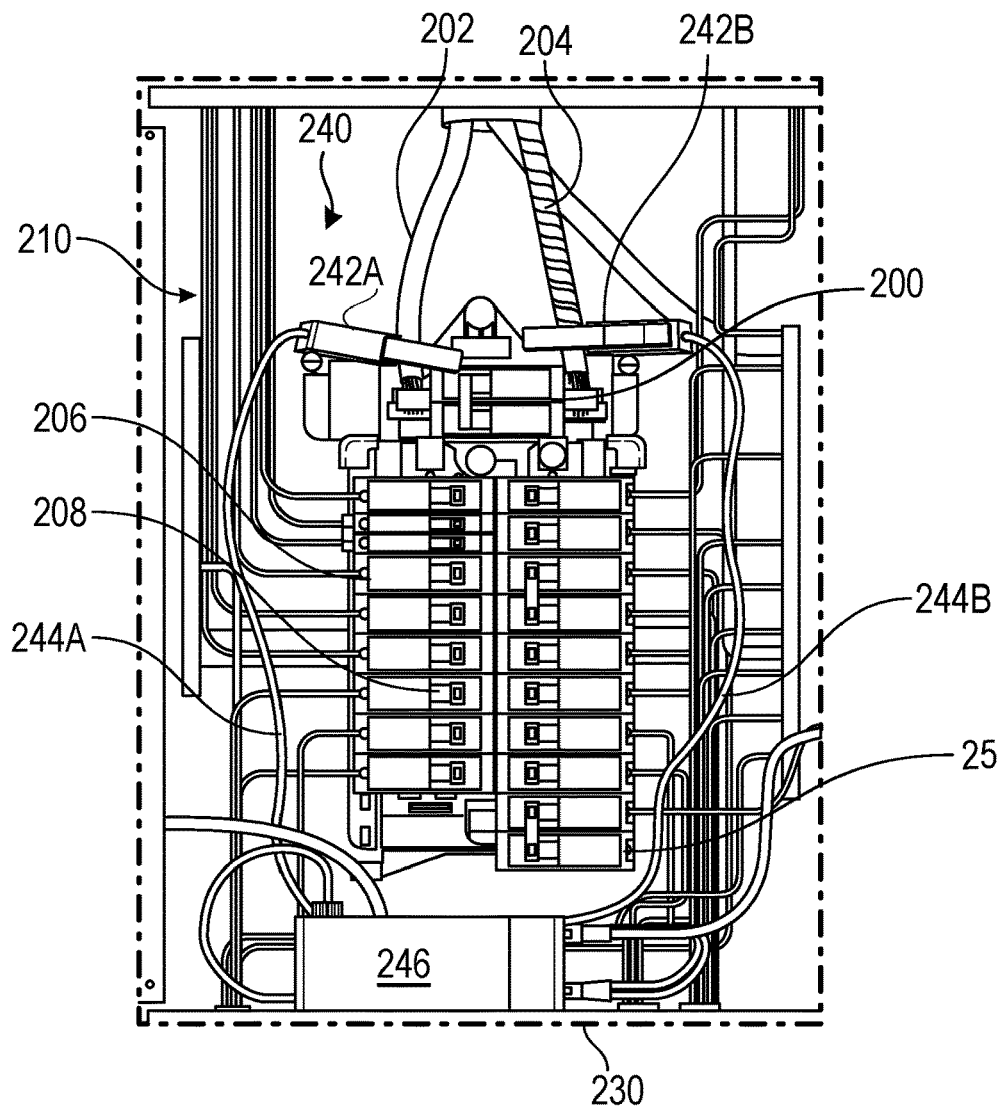
FIG. 3 is a schematic example of a distribution panel employable by the facility of FIG. 1.

An example distribution panel 230 is shown in FIG. 3. It is understood that other forms and structures may be employed in the distribution panel 230. The distribution panel 230 of FIG. 3 includes a main circuit breaker 200, which may be a large two-pole circuit breaker that limits the amount of electricity coming in from outside to protect the circuits that it feeds. The main circuit breaker 200 identifies the amperage capacity of the distribution panel 230. Referring to FIG. 3, the distribution panel 230 includes a plurality of circuit breakers 206 corresponding to respective branch circuits around the facility 16. For example, the plurality of circuit breakers 206 may respectively link to the laundry room, kitchen and main living area. The circuit breakers 206 are devices that automatically interrupt current flow when excessive current is detected. Each circuit breaker 206 has a reset switch 208 to allow the user to restore power to a branch circuit if the circuit breaker 206 has automatically shut off.

Referring to FIG. 3, the current sensor 240 includes first and second portions 242A, 242B that engage with (e.g., by clipping onto) the incoming wires 202 and 204, respectively, bringing power in from the electrical meter 28 (see FIG. 1). The first and second portions 242A, 242B of the current sensor 240 may connect via wires 244A and 244B, respectively, to an integrated processor 246. Referring to FIG. 3, multiple wires or bus bars 210 may be used to connect the various parts of the distribution panel 230. Some of the bus bars 210 may be neutral and others may be grounding bus bars. By continuously adjusting EVSE power as other loads within the facility 16 turn on and off, via the controller C, it is possible for the EVSE 20 to provide as much power as possible without tripping the main circuit breaker 200.

In some embodiments, the current sensor 40 (via the integrated processor 246) transmits data to the controller C via a wireless network 54 to enable real-time monitoring of home energy consumption. This data is sent to the controller C to allow it to determine the present total load power in the home and make real-time adjustments to EVSE power when required, e.g., to prevent the total home load from exceeding available utility power.

Figure 2:
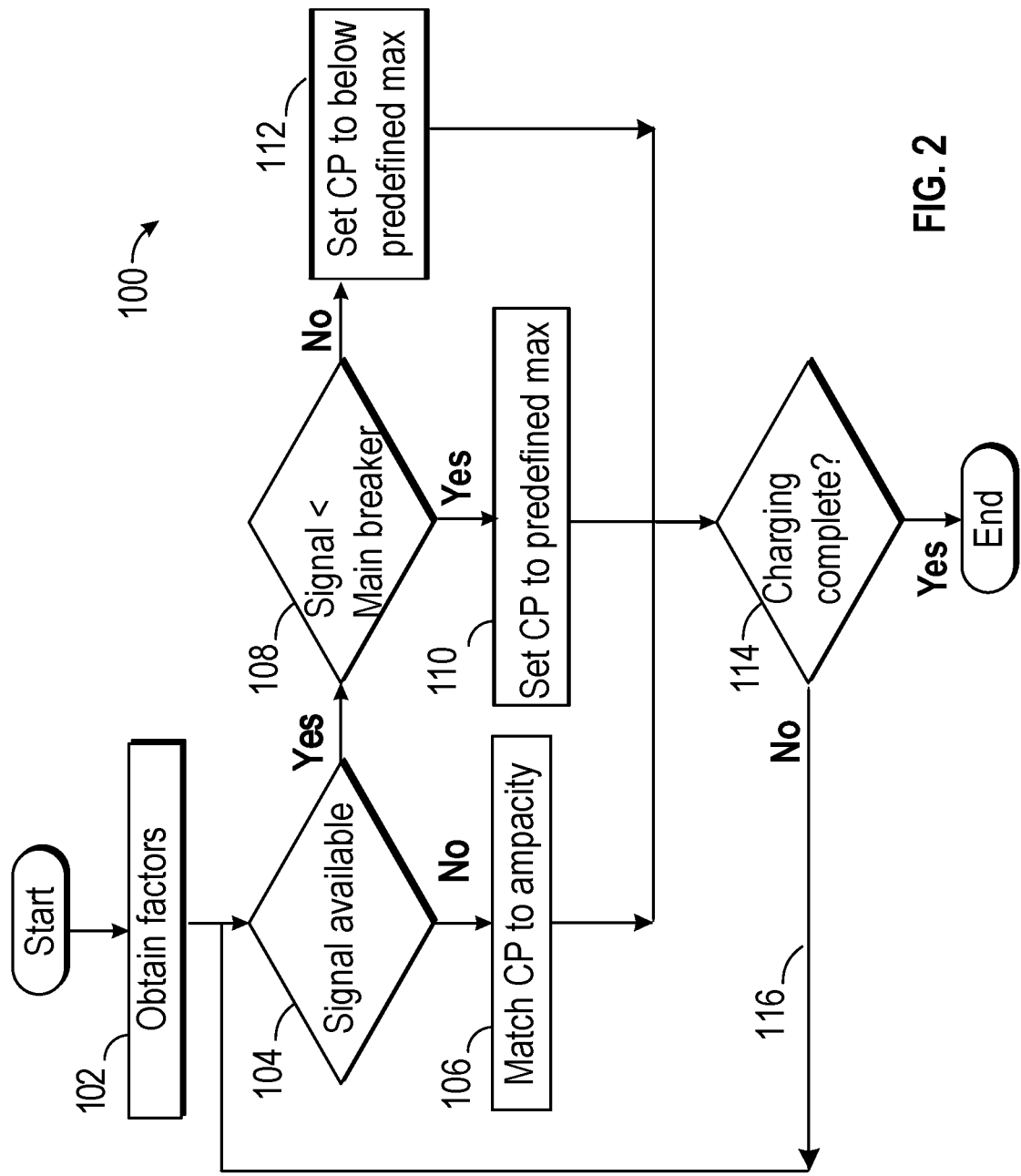
FIG. 2 is a schematic flow diagram of a method executable by the controller of FIG. 1.

Referring now to FIG. 2, a flowchart of the method 100 stored on and executable by the controller C of FIG. 1 is shown. Method 100 may be embodied as computer-readable code or instructions stored on and partially executable by the controller C of FIG. 1. Method 100 need not be applied in the specific order recited herein. Furthermore, it is to be understood that some steps may be eliminated. The method 100 may be dynamically executed. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Per block 102 of FIG. 2, the method 100 includes obtaining a plurality of factors, including an EVSE circuit breaker rating (of an EVSE circuit breaker 25, see FIG. 3, for the EVSE 20, see FIG. 1) and a main circuit breaker rating (of the main circuit breaker 200, see FIG. 1). The EVSE circuit breaker rating and the main circuit breaker rating respectively depend upon the characteristics of the EVSE 20 and the particulars of the power source 18 and/or the main circuit breaker 200 and are generally fixed.

The plurality of factors includes an available ampacity for the EVSE, which is the excess ampacity. The controller C is programmed to calculate the excess ampacity as the utility service rating minus the required facility ampacity. The required facility (e.g., home) ampacity is calculated per industry standard rules (e.g., NEC Article 220 rules) without regard to the particulars of the EVSE 20. Ampacity is defined as the maximum current, in amperes, that a conductor can carry continuously under the conditions of use without exceeding its temperature rating. The ampacity of a conductor depends on its ability to dissipate heat to the surrounding, and is a function of insulation temperature rating, the electrical resistance of the conductor material and the ambient temperature. The plurality of factors is stored in the controller C.

Advancing to block 104 of FIG. 2, the controller C is programmed to determine if the input current signal from the current sensor 40 is available. If the input current signal is not available, e.g., due to sensor failure (block 104=NO), the method 100 advances to block 106, where the control pilot signal ("CP" in FIG. 2) is adjusted to match the available ampacity (from block 102) for the EVSE 20. If the input signal is available (block 104=YES), the method 100 advances to block 108.

Per block 108 of FIG. 2, the method 100 includes determining if the input current signal is less than the main circuit breaker rating (from block 102) of the facility 16. If so, (block 108=YES), the method 100 advances to block 110 where the controller C is programmed to set the control pilot signal ("CP" in FIG. 2) to a predefined maximum. In one embodiment, the predefined maximum is set to be between about 65% and 80% of the EVSE circuit breaker rating. For example, the predefined maximum may be about 80% of the EVSE circuit breaker rating.

Figure 4:
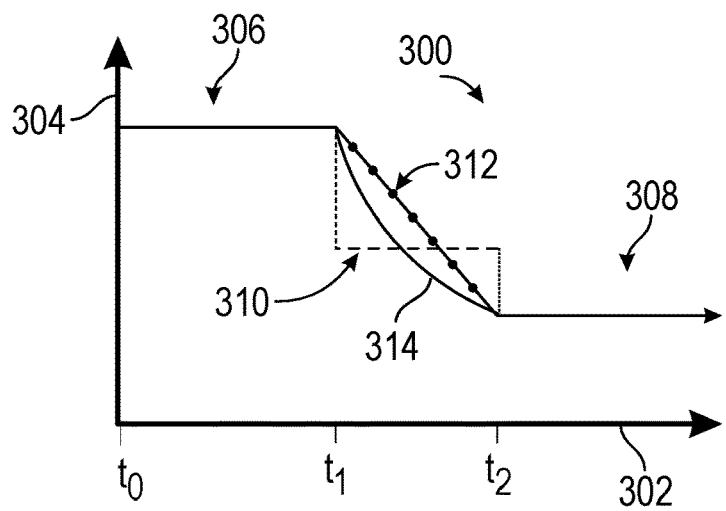
FIG. 4 is a schematic graph of an example control pilot signal employable in the system of FIG. 1.

If the input current signal is at or above the main circuit breaker rating, (block 108 =NO), the method 100 advances to block 112. Per block 112 of FIG. 2, the controller C is programmed to reduce the control pilot signal to a value below the predefined maximum. FIG. 4 is a schematic graph showing an example control pilot signal 300, with the vertical axis 304 indicating amplitude of the control pilot signal 300 (measured in amperes) and the horizontal axis 302 indicating time. Referring to FIG. 4, the control pilot signal 300 is set to a predefined maximum level 306 when the input current signal is below the main circuit breaker rating (at time $t_o$). At time $t_1$, the input current signal increases to at least the main circuit breaker rating, leading the controller C to reduce the control pilot signal 300 to below the predefined maximum level 306.

Referring to FIG. 4, in one embodiment, the controller C may reduce the control pilot signal 300 from the predefined maximum level 306 in a stepwise fashion, by instantaneously dropping it to at least one intermediate level 310 prior to reducing the control pilot signal 300 to a lower level 308 at time t2. In another embodiment, the controller C may reduce the control pilot signal 300 in a linear fashion (as indicated by line 312). In yet another embodiment, the reduction of the control pilot signal from the predefined maximum level 306 may be in a curved or exponential fashion (as indicated by line 314).

From blocks 106, 110 and 112, the method 100 proceeds to block 114. Per block 114 of FIG. 2, the controller C is programmed to determine if the charging has been completed to a satisfactory level. If so, the method 100 is ended. If not, the method 100 loops back to block 104, as indicated by line 116. If the current sensor signal is subsequently lost or unavailable during the charging (block 104), controller C sets the control pilot signal to the available ampacity (e.g., per NEC Article 220). This is done to allow charging to continue at a slower rate without potentially causing the main circuit breaker 200 to trip.

Referring to FIG. 1, data from the controller C may be shared with a mobile application 50 and/or onboard vehicle controller. The mobile application 50 may be embedded in a smart phone belonging to a user of the electric vehicle 12. The mobile application 50 may be plugged or otherwise linked to the electric vehicle 12. The circuitry and components of a mobile application 50 ("apps") available to those skilled in the art may be employed.

The controller C of FIG. 1 may access data or information from a remotely located or "off-board" cloud computing service, referred to herein as cloud unit 52. The cloud unit 52 may include one or more servers hosted on the Internet to store, manage, and process data, maintained by an organization, such as for example, a research institute or a company. Referring to FIG. 1, the controller C may be configured to communicate with the cloud unit 52 via a wireless network 54.

The wireless network 54 of FIG. 1 may be a short-range network or a long-range network. The wireless network 54 may be a communication BUS, which may be in the form of a serial Controller Area Network (CAN-BUS). The wireless network 54 may incorporate a Bluetooth™ connection, a Wireless Local Area Network (LAN) which links multiple devices using a wireless distribution method, a Wireless Metropolitan Area Network (MAN) which connects several wireless LANs or a Wireless Wide Area Network (WAN). Other types of connections may be employed.

In summary, the system 10 (via execution of method 100) provides the ability to continuously monitor the total incoming load (e.g., total home load) and dynamically adjust the charge power of the EVSE 20, working at a higher average power without tripping the main circuit breaker 200 of the facility 16. The system 10 enables faster charging for an electric vehicle 12, without requiring an electric utility service upgrade to existing homes or commercial buildings. For example, an owner of the electric vehicle 12 may plug into a suitable EVSE 20 at home, and the electric vehicle 12 may recharge overnight.

The controller C of FIG. 1 may be an integral portion of, or a separate module operatively connected to, other controllers of the vehicle 12. The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowchart shown in the FIG. 2. illustrates an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for charging an electric vehicle in a facility, the system comprising:
   an electric vehicle supply equipment (EVSE) configured to connect the electric vehicle to a power source in the facility, the EVSE being adapted to charge the electric vehicle based at least partially on a control pilot signal;
   a current sensor adapted to obtain an input current signal for the power source;
   a controller in communication with the EVSE, the controller having a processor and tangible, non-transitory memory on which instructions are recorded for dynamically adjusting the control pilot signal based on the input current signal;
   wherein the controller is configured to:
      obtain a plurality of factors, including an EVSE circuit breaker rating and a main circuit breaker rating of the facility;
      set the control pilot signal to a predefined maximum when the input current signal is less than the main circuit breaker rating of the facility;
      set the predefined maximum to correspond to between about 65% and 80% of the EVSE circuit breaker rating; and
      reduce the control pilot signal to below the predefined maximum, in at least one of a curved, exponential, and linear fashion, when the input current signal is at or above the main circuit breaker rating of the facility.

2. The system of claim 1, wherein the facility is a dwelling.

3. The system of claim 1, wherein the plurality of factors includes an available ampacity for the EVSE.

4. The system of claim 3, wherein the controller is adapted to adjust the control pilot signal to match the available ampacity for the EVSE when the input current signal is not available.

5. The system of claim 1, further comprising:
   a distribution panel having a plurality of circuit breakers corresponding to respective branch circuits around the facility, the current sensor being operatively connected to a portion of the distribution panel.

6. The system of claim 1, wherein the controller is embedded with the EVSE.

7. A method for charging an electric vehicle in a facility with a system having a controller with a processor and tangible, non-transitory memory, the method comprising:
   connecting an electric vehicle supply equipment (EVSE) between the electric vehicle and a power source in the facility, the EVSE being adapted to charge the electric vehicle based at least partially on a control pilot signal;
   connecting a current sensor to the power source;
   obtaining an input current signal for the power source, via the current sensor;
   obtaining a plurality of factors, including an EVSE circuit breaker rating and a main circuit breaker rating of the facility, via the controller;
   dynamically adjusting the control pilot signal based on the input current signal and the plurality of factors, via the controller, including:
      setting the control pilot signal to a predefined maximum when the input current signal is less than the main circuit breaker rating of the facility;

setting the predefined maximum to correspond to between about 65% and 80% of the EVSE circuit breaker rating; and reducing the control pilot signal to below the predefined maximum, in at least one of a curved, exponential, and linear fashion, when the input current signal is at or above the main circuit breaker rating of the facility.

8. The method of claim 7, further comprising:

obtaining an available ampacity for the EVSE in the plurality of factors, via the controller; and adjusting the control pilot signal to match the available ampacity for the EVSE when the input current signal is unavailable.

9. The method of claim 7, further comprising:

selecting a dwelling as the facility.

10. The method of claim 7, wherein the facility includes a distribution panel, further comprising:

installing a plurality of circuit breakers in the distribution panel corresponding to respective branch circuits around the facility and connecting the current sensor to a portion of the distribution panel.

* * * * *